INVENTORS.
WILLIAM R. HAWKINS
WILLIAM H. WELLS
by Flam and Flam
ATTORNEYS.

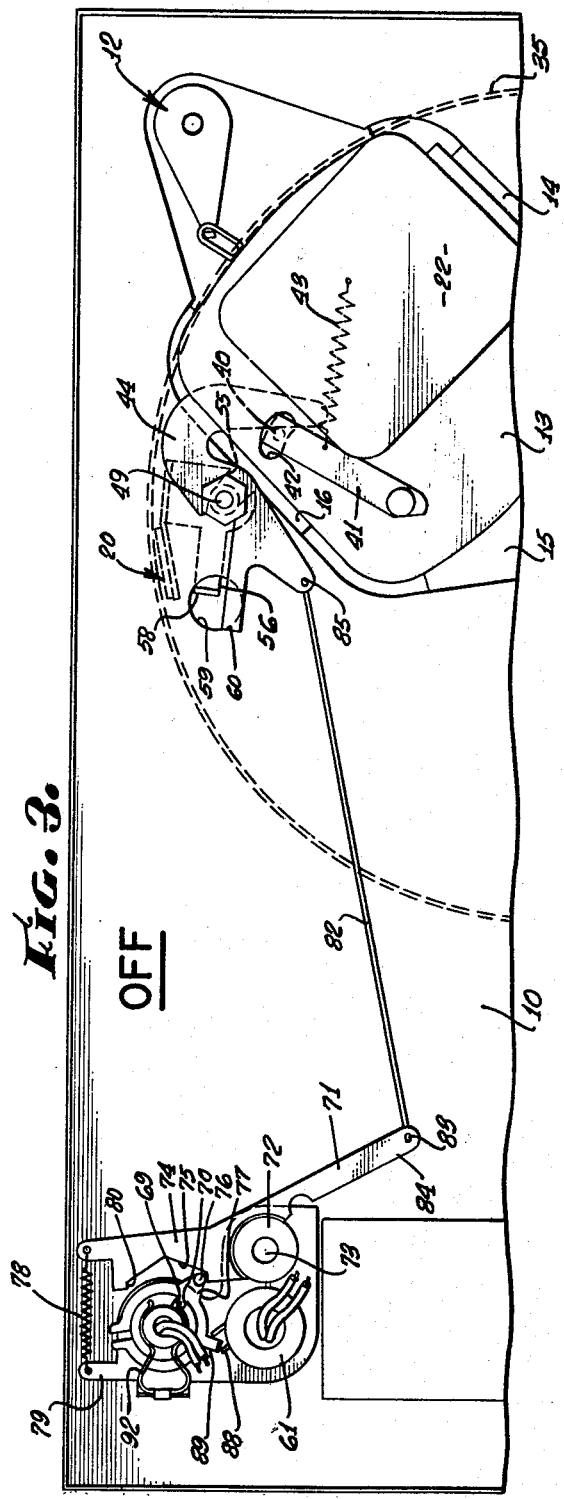

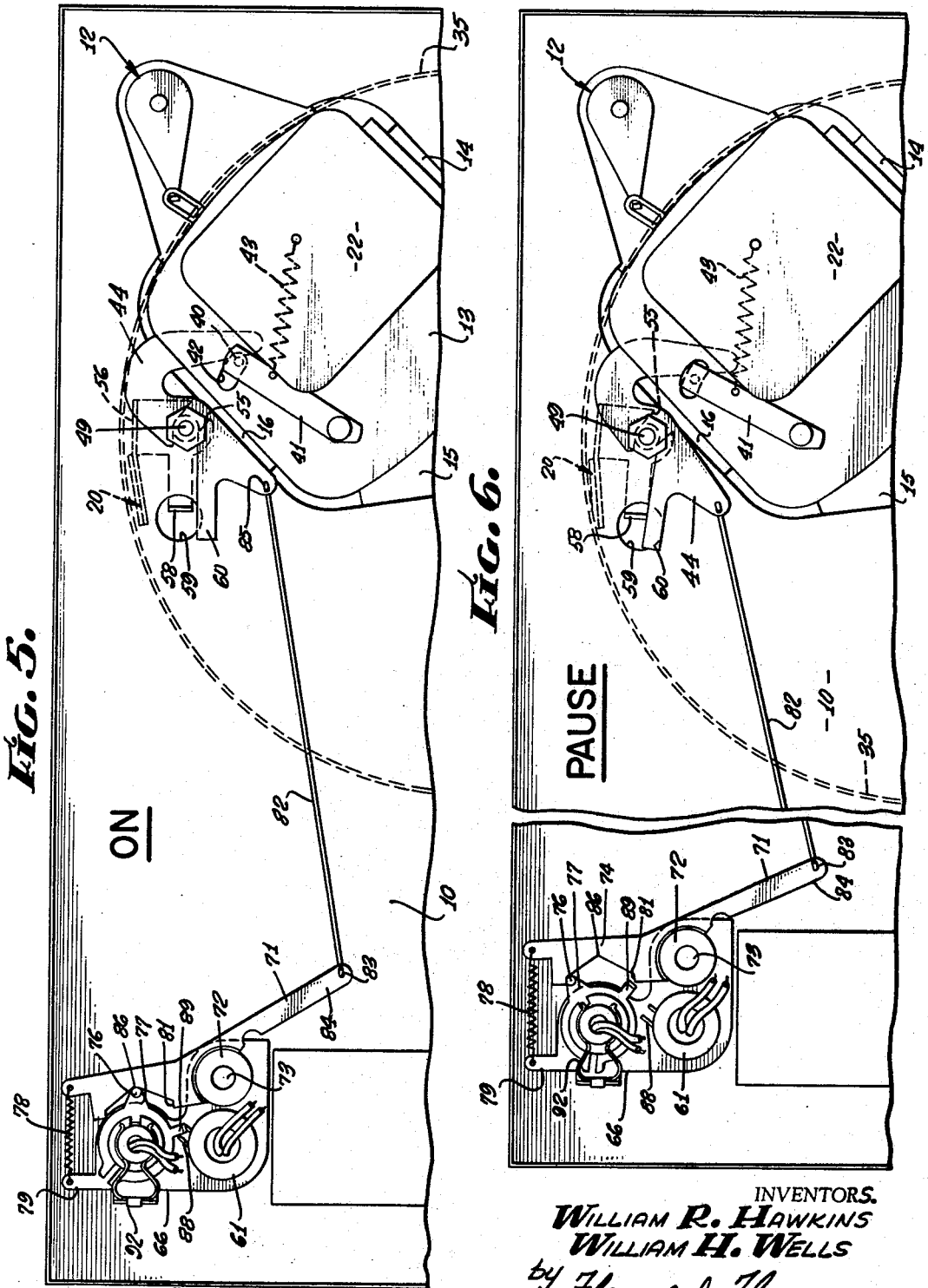

United States Patent Office

3,498,619
Patented Mar. 3, 1970

3,498,619
PHONOGRAPH PAUSE CONTROL
William R. Hawkins, Van Nuys, and William H. Wells, Woodland Hills, Calif., assignors to Newcomb Electronics Corp., Los Angeles, Calif., a corporation of California
Filed Aug. 3, 1964, Ser. No. 386,912
Int. Cl. G11b 3/60
U.S. Cl. 274—39                                   14 Claims

ABSTRACT OF THE DISCLOSURE

A manual actuator or knob 62 (FIGS. 1 and 7) on the phonograph deck 10 has three positions corresponding to OFF, ON and PAUSE, with the ON position between the OFF and PAUSE positions. A lamp 90 illuminates the actuator 62 when it is in ON or PAUSE position. A standard motor pulley assembly 12 (FIG. 1) incorporates a pulley 24 that simultaneously engages a motor shaft 23 and the rim 36 of the turntable 35 under the influence of a spring 38. Operation of the speed selector mechanism 34 moves the pulley 24 out of engagement from the shaft 23 by virtue of the cam surfaces 39 (FIG. 2), a pin 40 and a recess 42 in a floating bracket 25 on which the pulley 24 is mounted. A linkage including a lever 44 (FIG. 3) between the knob 62 and the pin 40 retracts the pulley 24 at the PAUSE and OFF positions (FIGS. 6 and 3) of the actuator. At the PAUSE position only, the lever 44 also operates a brake 20.

BRIEF SUMMARY OF INVENTION

This invention relates to phonographs, and particularly to phonographs having a pause control.

It is often desirable for a teacher or lecturer to stop a phonograph in the middle of a record for discussion and then start the phonograph again. One known device has a selectively operable spring biased lever when depressed pulls the driving pulley away from the turntable, and when released re-establishes a driving relationship. This arrangement has several disadvantages. The turntable coasts a short distance when the lever is operated and some of the transcription will be lost. The teacher may not find it convenient to maintain continuous pressure on the lever especially during a long interruption. The teacher may be required to demonstrate a point at a blackboard, etc. Also the lever to some extent compilcates the operation of the phonograph; a teacher concerned with the problems of instruction may fumble and not operate the lever as soon as it is desired to do so.

The primary object of this invention is to overcome these disadvantages.

Another object of this invention is to provide a phonograph capable of instantaneous stopping and starting and which is nevertheless controlled by a single operating knob or lever.

Another object of this invention is to provide a phonograph of this character in which a pilot light is incorporated in a translucent knob or lever itself whereby the user need be concerned only with one element for the entire operation of the phonograph, save only speed selection.

Another object of this invention is to provide a single element illuminable control for a phonograph of this character in which the element has only three positions:
 (1) Dark, brake off, motor off, pulley released,
 (2) Light, brake off, motor on, pulley engaged,
 (3) Light, brake on, motor on, pulley released.

Another object of this invention is to provide a simple cam and linkage mechanism for operating the brake and the pulley structure.

Another object of this invention is to provide a simple mechanism of this character that is fully compatible with a standard pulley assembly. For this purpose, the linkage when operative simply retracts the pulley against a spring, and when not operative, clears the pulley assembly entirely.

This invention possesses many other advantages, and has other objects which may be made more clearly apparent from a consideration of one embodiment of the invention. For this purpose, there is shown a form in the drawings accompanying and forming a part of the present specification, and which drawings, unless as otherwise indicated, are true scale. This form will now be described in detail, illustrating the general principles of the invention; but it is to be understood that this detailed description is not to be taken in a limiting sense, since the scope of this invention is best defined by the appended claims.

BRIEF DESCRIPTION OF THE DRAWINGS

FIGURE 1 is a top plan view of a phonograph incorporating the present invention, a portion of the phonograph turntable being broken away and shown in section, the phonograph being ON;

FIG. 3 is a fragmentary bottom plan view of the phonograph shown in OFF position;

FIG. 4 is an enlarged sectional view taken along the offset plane indicated by line 4—4 of FIG. 2;

FIGS. 5 and 6 are views similar to FIG. 3 but illustrating alternate positions of the mechanism.

DETAILED DESCRIPTION OF THE PREFERRED EMBODIMENT

Figure 1:
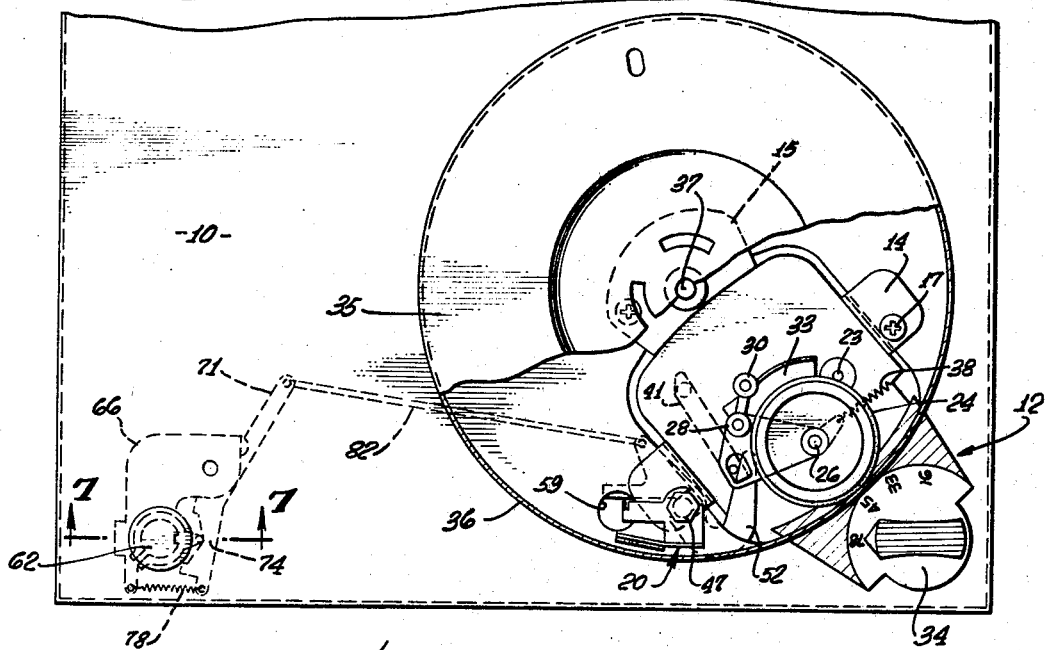

In FIG. 1 there is illustrated a phonograph deck 10 adapted to be installed in a suitable carrying case or cabinet. Beneath the surface of the deck 10 an amplifier (not shown) may be installed.

The deck 10 has a generally rectangular opening 11 (FIG. 2) that receives a standard motor-pulley assembly 12. This assembly 12 includes a mounting plate 13 having three ears 14, 15 and 16 that overlie the edges of the opening 11. The ears 14, 15 and 16 are angled (FIG. 4) and thus downwardly offset the plate 13 in the opening 11. Screws 17 and 18 (FIG. 2) secure the ears 14 and 15 in the conventional manner. However, the ear 16 (FIG. 4) is fastened to the deck 10 by a bearing assembly 19 that mounts a brake structure 20 above the deck 10 and a spindle release mechanism 21 below the deck 10. The brake structure 20 and the spindle release mechanism 21 form parts of the pause control to be described more fully hereinafter.

On the under side of the mounting plate 13 is a motor 22 (FIG. 3). The motor 22 has a shaft 23 (FIGS. 2 and 4) that projects through the mounting plate 13 for cooperation with the driving pulley 24 in a conventional manner. The driving pulley 24 is mounted upon a floating bracket 25. The bracket 25 has a bearing pin 26 that receives the hub of the pulley 24. The bracket 25 has another pin 27 that projects upwardly through a bearing sleeve 28 formed at the end of an arm 29. The arm 29 in turn has a sleeve 30 that is journalled upon a post 31 projecting upwardly from the mounting plate 13. The sleeve 30 (FIG. 4) is spring-pressed downwardly along the post 31 by the aid of a light compression spring 32 to engage the arcuate notched rim of the rotary cam 33. In its lower position, the pulley 24 is opposite a section of the driving shaft 23 of relatively large diameter. By moving the sleeve 30 upwardly the pulley is positioned opposite other sections of the driving shaft 23. A conventional projection and slot structure couples the cam 33 to an operating knob 34.

A turntable 35 has a downwardly extending peripheral flange 36 that is adapted to be engaged by the driving pulley 24. The turntable 35 (FIG. 2) has a hub that is detachably mounted upon a bearing 37 projecting upwardly from the middle mounting ear 15. The pulley 24 is adapted to engage along the inner surface of the turntable flange 36 in a conventional manner. A spring 38 anchored above the mounting plate 13 engages the pulley bracket 25 and pulls the pulley toward the driving shaft 23 and toward the flange 36.

Figure 2:
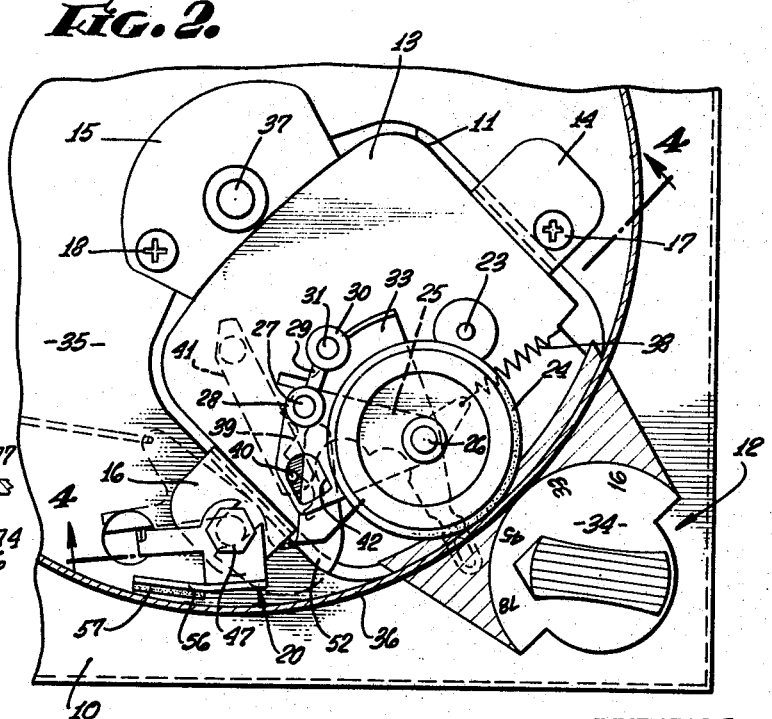
FIG. 2 is an enlarged view similar to FIG. 1 and illustrating the apparatus when the speed control knob is moved.

Before the pulley 24 is shifted to different parts of the driving shaft 23, it is first moved outwardly away from the driving shaft 23. This prevents the pulley from hitting the shoulders between shaft sections of different diameters. For this purpose, three lobes 39 of the cam 33 move a retracting pin 40. The pin 40 is mounted on a lever 41 pivoted beneath the mounting plate 13. The pin 40 projections through a clearance aperture in the plate 13 and through an enlarged opening 42 in the pulley bracket 25. The pin 40 and aperture 42 form elements of a lost motion connection. The pin 40 is held against the cam 33 by the aid of a spring 43 (FIG. 3), located beneath the mounting plate 13. As the cam 33 is rotated, the pin 40 is moved from the position of FIG. 1 and out of the trough between the cam lobes 39. The edge of the opening 42 is engaged, and the bracket 25 is moved to the left as shown in FIG. 2, carrying the pulley 24 away from the driving shaft 23. Before the bracket 25 is released, the notched arcuate rim of the cam 33 shifts the pulley bracket 25 up or down. The spring 43 returns the pin 40 into the trough between the next adjacent lobes and the bracket returns to cause the pulley to re-engage the shaft 23.

Except for the bearing assembly 19, the brake structure 20, and the spindle release mechanism 21 heretofore identified, the motor-pulley assembly is of a known commercially available type.

In order to achieve a pause control, the pin 40 is also operated by a pause lever 44. The lever 44, is shown most clearly in FIGS. 3, 4 and 5, is pivotally mounted upon the bearing assembly 19 beneath the mounting plate 13.

The bearing assembly 19 includes a pair of spacers 45 and 46 (FIG. 4) below and above the deck 10. A post or machine screw 47 extends through aligned apertures in the spacers 45 and 46, the ear 16 and the deck 10. The head 48 of the screw is located above the deck 10, and the threaded shank end 49 projects beneath the deck 10 beyond the spacer 45. A nut 50 is secured to the shank 49. The lever 44 has a mounting recess (FIG. 3) that fits about the shank 49 between the spacer 45 and the nut 50.

One end 52 of the lever 44 projects from beneath the deck 10 into the deck opening 11 along the upper surface of the mounting plate 13. The end 52 is positioned behind the pulley retracting pin 40 so that movement of the lever 44 in a counterclockwise direction from the ON position of FIG. 2 to the OFF or PAUSE positions of FIGS. 3 and 6 engages the pin 40 and causes it in turn to retract the pulley mounting bracket 25.

The lever 44 has three angular positions. In the ON position of FIG. 5 the lever 44 is in its counterclockwise-most position. Thus the pin 40 is permitted to seat in the troughs between the cam lobes 39 under the action of the return spring 43. Thus the pulley bracket 25 is pulled by a spring 38 (FIGS. 1, 2 and 4) so as to cause the pulley 24 to engage both the driving shaft 23 and the turntable flange 36. The apparatus is thus ON or in driving position.

The lever 44 is movable to an OFF position (FIG. 3) in which the lever is turned a slight amount clockwise from the position of FIG. 5. In this position the pin 40 is engaged and the pulley bracket 25 is retracted against the force of its spring 38. The lever 44 is movable still further in a clockwise direction to the PAUSE position of FIG. 6. In this position the pin 40 is of course engaged as it is in FIG. 3 to retract the pulley. In addition, the brake structure 20 is now actuated by the added lever movement.

The brake structure includes a plate 54 made of sheet metal or the like having a slot or recess 55 in one side surface that seats about the post or machine screw 47 between its head and the spacer 46 (see FIG. 2) on the upper side of the deck 10. The plate 54 has a bent up flange 56 that is opposed to the flange 36 of the turntable 35. By movement of the brake plate 54 in a clockwise direction about the post 47, the brake plate flange 56 moves to engage the rim. A felt or other pad 57 carried by the end of the brake flange 56 provides a suitable conformable soft structure for transfer of braking force to the rim or flange 36 of the turntable 35. The flange 56 projects generally tangentially of the axis of the screw or post 47 in the direction that the turntable normally moves so that the rotation of the turntable tends to free the brake rather than to bind it.

In order to actuate the brake plate 54, it is provided with a second downwardly extending projection 58 that passes through a clearance aperture 59 in the deck 10, its end being engageable with an arm 60 of the lever 44. The projection 58 and arm 60 form elements of a lost motion connection. The projection 58 is moved by the arm 60 only when the lever 44 is moved to its clockwise-most or PAUSE position shown in FIG. 6. But it is not engaged when the lever 44 is in the intermediate or OFF position shown in FIG. 3, or the counterclockwise-most or ON position shown in FIG. 5. Whether or not the brake is applied in the OFF position is largely immaterial; however, users expect the turntable to be free when the photograph is off.

Figure 7:
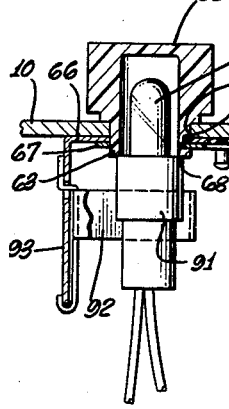
FIG. 7 is an enlarged sectional view taken along the plane corresponding to line 7—7 of FIG. 1.

In order to control the movement of the lever 44 and to control the operation of a switch 61 for the motor and amplifier, a manual actuator, in this instance in the form of a rotary knob 62, is provided. The knob 62 is made of translucent plastic material. As shown in FIG. 7, the knob 62 has a hub 63 that projects through an aperture 64 in the deck 10 at a place spaced from the turntable. The hub 63 also passes through an aperture 65 in a mounting bracket 66 located beneath the deck 10. A snap ring 67 (FIGS. 3 and 7) fits in a groove 68 of the knob 62 and secures the knob against removal therefrom.

The snap ring 67 has an inwardly extending projection 69 (FIG. 3) that enters a recess 70 formed at the end of the hub whereby the snap ring is coupled to the knob for purposes presently to appear.

The PAUSE lever 44 has three angular positions, with the OFF position of FIG. 3 in the middle. But the middle position of the knob 62 should be the ON position in order to achieve proper control. Thus a pause condition should be achieved without turning the apparatus off, and the on-off operation should be achieved without requiring the apparatus to go through a pause mode. A special cam linkage operated by the snap ring 67 is provided for this purpose.

The linkage includes a first link 71 made of sheet metal or the like, having an offset pivot plate 72 that abuts the mounting bracket 66. A rivet 73 passes through the face plate 72, the mounting bracket 66, and the deck 10 and thus secures the bracket 66 in place beneath the deck and furthermore mounts the lever 71 for pivotal movement about the rivet 73. The offset face plate 72 ensures clearance of the ends of the lever 71 beneath the deck 10.

One end 74 of the lever 71 lies adjacent the snap ring 67 and has a V-shaped cam groove, notch or track 75 opposed to the snap ring 67. Cooperable with the groove 75 is a pin or cam member 76 that is mounted upon a radial projection 77 of the snap ring 67. A tension spring 78 fastened to the end of the lever end 74 and to a bent out projection 79 of the mounting bracket 66 urges the lever 71 in a counterclockwise direction about its axis, and thus causes the cam track or groove 75 to engage the pin 76.

Opposite ends of the cam track or groove 75 have abutment surfaces 80 and 81 that determine limits to the angular movement of the cam member or pin 76.

A link in the form of a rod 82 couples the link 71 and the pause lever 44. One end of the rod 82 has a bent end 83 engaging the end 84 of the link 71 opposite the cam track 75. The opposite end of the rod 82 has a bent end 85 that engages an aperture of the lever 44.

When the snap ring 67 and the actuating knob 62 are in the OFF position illustrated in FIG. 3, the pin 76 engaging the abutment surface 81, the intermediate angular position of the pause lever 44 is determined in which the pulley is released. When the snap ring 67 and knob are at the next angular or ON position, as illustrated in FIG. 5, the pin 76 is at the apex 86 of the cam groove 75. The counterclockwise-most position of the pause lever 44 is thus determined and the pulley engages the drive shaft 23. When the knob 62 and pin 76 are at the next angular or PAUSE position of FIG. 6, the clockwise-most position of the lever 44 is determined and the brake structure 20 is actuated while the pulley is released. The cam groove 75 is so situated as to ensure the foregoing relationships.

The knob 62 also operates a switch 61 for controlling the amplifier and the motor 22. The switch 61, as shown in FIG. 3, is attached to the mounting bracket 66 in spaced relationship to the knob 62. It has a bifurcated operating arm 88 that snaps between stable positions shown in FIGS. 3 and 5 respectively, corresponding to OFF and ON. A projection 89 of the snap ring 67 works between the bifurcations of the arm 88 and thus operates it. The projection may move away from the bifurcated arm 88 when the knob 62 moves from the ON position of FIG. 5 to the PAUSE position of FIG. 6. But as soon as the knob returns to the ON position, the coupling is re-established.

The knob 62 is iluminated by an incandescent lamp 90 (FIG. 7). This lamp is mounted at the end of a socket structure 91 that is in turn releasably held by a spring clamp 92. The clamp 92 is affixed to a projection 93 of the mounting bracket 66 and so situated that its jaws are aligned with the knob 62 beneath its apertured hub 63, approximately orienting the lamp 90 in the knob 62. The switch structure 87 also operates the pilot lamp 90.

There is only one actuator 62 to operate. Legends are actually unnecessary; the lamp 90 and the state of motion of the turntable adequately advise the operator. In the OFF position of FIG. 3, the lamp, motor and amplifier are off. The brake is released but the pulley is free so that the driving shaft 23 does not produce an indentation in the pulley periphery. In the ON position of FIG. 5, the lamp, motor and amplifier are on. The pulley is engaged and the brake is released. In the PAUSE position, the lamp, motor and amplifier are on. The pulley is released and the brakes are applied. Since the ON position is between the OFF and PAUSE positions, conventonal on-off operation is achieved without ever causing a pause; also a pause is accompuished from a running position without first turning the apparatus off. All this is accomplished by a single actuator.

The inventors claim:

1. In a phonograph having a turntable, a power shaft having a plurality of sections of different diameters, and electric motor for operating the shaft, and a pulley structure selectively engageable with sections of the power shaft for operating the turntable, spring means urging the pulley structure to engage said power shaft, said pulley structure being supported for movement away from said power shaft against the force of said spring means, the combination therewith of: a brake structure for the turntable and supported for movement in a path for engagement with or disengagement from said turntable; a lever supported for pivotal movement, and having a part capable of connection with the pulley structure for movement of the pulley structure away from said power shaft upon movement of said lever from one angular position to a second angular position; means forming a connection between said brake structure and said lever and operative to cause the brake to be applied upon movement of said lever to a third angular position beyond said second position; a manual actuator having three positions corresponding to ON, OFF and PAUSE with the ON position between the other positions; and a linkage between the actuator and the lever for moving the lever to said one angular position at the ON position, for moving the lever to said second angular position at the OFF position, and for moving the lever to said third angular position at the PAUSE position of said actuator.

2. The combination as set forth in claim 1 together with means determining limits to the movement of said actuator and corresponding to OFF and PAUSE positions respectively.

3. In a phonograph having a turntable, a power shaft having a plurality of sections of different diameters, an electric motor for operating the shaft, and a pulley structure selectively engageable with sections of the power shaft for operating the turntable, spring means urging the pulley structure to engage said power shaft, said pulley structure being supported for movement away from said power shaft against the force of said spring means, the combination therewith of: a brake structure for the turntable and supported for movement in a path for engagement with or disengagement from said turntable; a lever supported for pivotal movement; means forming a lost motion connection between the pulley structure and the lever for retracting the pulley structure, and operative upon movement of the lever from one angular position to a second angular position; means forming a lost motion connection between the brake structure and the lever and operative upon movement of the lever to a third angular position beyond said second position; a manual actuator for said lever and having three positions corresponding to OFF, ON and PAUSE, with OFF and PAUSE positions on opposite sides of the ON position; and a cam linkage between the actuator and the lever for moving the lever to said one angular position when said actuator is in ON position, said cam linkage moving the lever to said second angular position when said actuator is in OFF position, and said cam linkage moving said lever to said third position when said actuator is in PAUSE position.

4. In a phonograph having a deck, a motor-pulley assembly attached to the deck, and a turntable mounted upon the motor-pulley assembly having a peripheral rim, the combination therewith of: a post carried by the deck and located inside the rim; a brake structure pivotally mounted on the post above the deck for cooperation with the inside of said turntable; a lever pivotally mounted on the post beneath the deck and having a part movable to disengage the pulley from the motor; a lost motion connection between the brake and the lever and operative when the pulley is disengaged to brake the turntable including a part extending through an aperture in the deck; a manual actuator mounted on the deck and having a part located beneath the deck; and means forming a connection between the lever and the actuator and located entirely beneath the deck.

5. In a phonograph having a deck, a motor-pulley assembly attached to the deck, said assembly having a power shaft, a pulley element movably mounted for engagement with and disengagement from said power shaft, a bearing for a turntable, a turntable mounted on the bearing and having a peripheral rim, a spring urging the pulley element to engage the shaft and said turntable, the combination therewith of: a post carried by the deck and located inside the rim; a brake structure pivotally mounted on the post above the deck for cooperation with the inside of said turntable; a lever pivotally mounted on the post beneath the deck and having a part engageable with the motor-pulley assembly to retract the pulley element, said lever having three positions corresponding to PAUSE, ON, and OFF, said lever in the OFF and PAUSE positions retracting said pulley, said lever having a connection with said brake structure to operate the same when the lever is in PAUSE position including a part extending through an aperture in the deck; a manual actuator mounted on the deck and having a part located beneath the deck; and means forming a connection between the lever and the actuator and located entirely beneath the deck for moving said lever to said PAUSE, on and OFF positions.

6. In a phonograph having a deck, a motor-pulley assembly attached to the deck, said assembly having a power shaft, a pulley element movably mounted for engagement with and disengagement from said power shaft, a bearing for a turntable, a turntable mounted on the bearing and having a peripheral rim, a spring urging the pulley element to engage the shaft and said turntable, the combination therewith of: a post carried by the deck and located inside the rim; a brake structure pivotally mounted on the post above the deck for cooperation with the inside of said turntable; a lever pivotally mounted on the post beneath the deck and having a part engageable with the motor-pulley assembly to retract the pulley element, said lever having three positions corresponding to PAUSE, ON and OFF, said lever in the OFF and PAUSE positions retracting said pulley, said lever having a connection with said brake structure to operate the same when the lever is in PAUSE position including a part extending through an aperture in the deck; a manual actuator mounted on the deck and having a part located beneath the deck; and means forming a connection between the lever and the actuator and located entirely beneath the deck for moving said lever to PAUSE, ON and OFF positions; means forming opposite limits to the movement of said actuator; said connection causing said lever to assume OFF and PAUSE positions at said opposite limits respectively and said ON position when said actuator is intermediate said limits.

7. In a phonograph having a turntable, a driving shaft and a pulley for transferring rotary power from the driving shaft to the turntable: a support; an actuator member; means mounting the actuator member on the support for a movement about an axis; a lever member mounted on the support for angular movement about an axis parallel to said actuator member axis; means forming a cam track on one of said members; means forming a cam part on the other of the members and engageable with the cam track; spring means urging the lever member in an angular direction to cause engagement of said cam part and said cam track; said actuator member having three successive angular positions determined by said cam track corresponding respectively to OFF, ON and PAUSE, the cam track having a configuration such that the lever member is at one end of its angular travel when the actuator member is in its intermediate ON position and away from said one end of angular travel when the actuator is in said OFF and PAUSE positions; and means operated upon movement of said lever away from its said one end of angular travel for moving the pulley away from said driving shaft.

8. The combination as set forth in claim 7 together with switch means for controlling said driving shaft and operated by movement of the actuator member from OFF to ON position.

9. The combination as set forth in claim 7 together with means determining limits to the movement of said actuator member and corresponding to OFF and PAUSE positions respectively.

10. In a phonograph having a turntable, a driving shaft and a pulley for transferring rotary power from the driving shaft to the turntable: a support; an actuator member; means mounting the actuator member on the support for movement about an axis; a lever member mounted on the support for angular movement about an axis parallel to said actuator member axis; means forming a cam track on one of said members; means forming a cam part on the other of the members and engageable with the cam track; spring means urging the lever member in an angular direction to cause engagement of said cam part and said cam track; said actuator member having three successive angular positions determined by said cam track corresponding to OFF, ON and PAUSE, the cam track having a configuration such that the lever member at one end of its angular travel when the actuator member is in its intermediate ON position; and at the other end of its angular travel when the actuator member is in its PAUSE position; means operated upon movement of said lever away from its said one end of angular travel for moving the pulley away from said driving shaft; a brake for stopping the turntable; and means operated upon movement of said lever to its said other end of its angular travel for operating said brake.

11. The combination as set forth in claim 10 in which said lever is in an intermediate position when the actuator member is in its OFF position.

12. The combination as set forth in claim 10 together with means determining limits to the movement of said actuator member and corresponding to OFF and PAUSE positions respectively.

13. The combination as set forth in claim 10 together with switch means for controlling said driving shaft and operated by movement of the actuator member from OFF to ON position.

14. The combination as set forth in claim 11 together with switch means for controlling said driving shaft and operated by movement of the actuator member from OFF to ON position.

References Cited

UNITED STATES PATENTS

| | | | |
|---|---|---|---|
| 2,441,836 | 6/1944 | Nakken | 274—9 |
| 2,989,311 | 6/1941 | Vistain | 274—10 |
| 3,101,950 | 8/1963 | Schneider | 274—9.1 |
| 3,118,679 | 1/1964 | Lyon | 274—9 |
| 2,699,141 | 1/1955 | Gaguski | 240—2.1 |

LEONARD FORMAN, Primary Examiner

D. A. DEARING, Assistant Examiner